VOLTAGE CONTROLLED OSCILLATOR

Filed Jan. 27, 1960 2 Sheets-Sheet 1

INVENTORS.
JOHN F. BETTS
PAUL A. MICHAELS
WILLIAM G. WOLBER
BY
Richard I. Seeger
ATTORNEY

INVENTORS.
JOHN F. BETTS
PAUL A. MICHAELS
BY WILLIAM G. WOLBER

Richard T. Seeger
ATTORNEY 3,187,272
VOLTAGE CONTROLLED OSCILLATOR
John F. Betts, Farmington, Paul A. Michaels, Livonia, and William G. Wolber, Detroit, Mich., assignors to The Bendix Corporation, a corporation of Delaware
Filed Jan. 27, 1960, Ser. No. 4,963
6 Claims. (Cl. 331—144)

This invention pertains to a voltage controlled oscillator wherein a direct current voltage is applied at the input and at the output is a signal with a frequency corresponding to the magnitude of the input voltage. More particularly, this invention pertains to a voltage controlled oscillator which has a very linear relation between the input voltage and the output frequency, has a self-starting feature, has a linear high impedance input, and is capable of very high frequencies.

It is an object of this invention to provide a voltage controlled oscillator having a high impedance linear input which has a cathode follower tube having its grid connected to the circuit input and its cathode output modified in an inverse manner by its plate potential. As the current through the cathode follower increases, the plate potential will decrease since it is connected through a resistance to a constant potential source and this decrease is felt at the grid of a second tube having its plate connected to the high potential source and its cathode connected to the control grid of a third tube which has its plate connected to the cathode follower cathode. In this manner any current deviation of the cathode follower will cause a corresponding increase or decrease in its plate voltage which is fed back to the cathode of the cathode follower through the second and third tube to adjust it accordingly and hold the current to a constant value.

It is a further object of this invention to provide in the oscillator portion of the voltage controlled oscillator a pair of phantastron circuits each having a pentode tube with the screen grid of one tube coupled to the control grid of the other tube in such a manner as to cause alternate plate conduction of the tubes with a resistance-capacitance coupling between the suppressor grid and the screen grid of each tube so that after the potential of the suppressor grid is reduced to the tube cut off point by the screen grid, the charge across the condenser will slowly discharge through the resistor building up the suppressor grid potential to a point which will fire the tube in case the other phantastron tube has failed to perform its triggering function.

It is another object of this invention to connect to the suppressor grid of each phantastron tube the grid of a triode which has its plate connected to the output circuit which prevents the suppressor grid from going above ground potential and which establishes in the output circuit a pulse each time a tube is triggered.

These and other objects will become more apparent when a preferred embodiment of this invention is considered in connection with the drawings in which.

Figure 1:
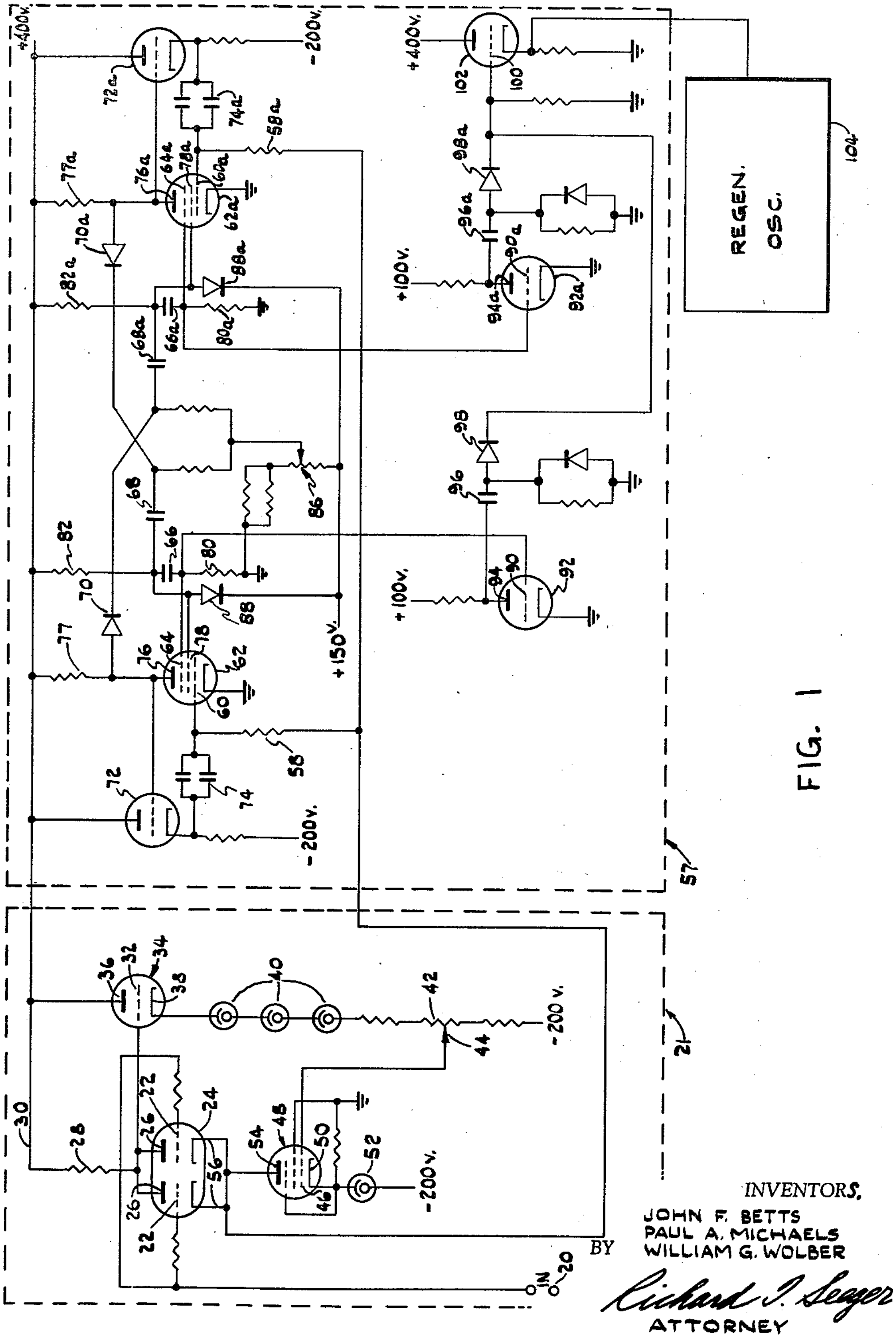
FIGURE 1 is a schematic block diagram view of the preferred embodiment.

In the schematic drawing of FIGURE 1 is shown an input 20 at which point is applied a direct current voltage of varying magnitude which is converted by the circuit of this invention to a corresponding variable frequency at the output of the circuit. For many applications a high impedance input to the oscillator portion of the circuit is desirable and it is also desirable that the input circuit have good linearity so that the overall linearity of the input and oscillator portions of the circuit be high. Such linearity is provided by connecting input 20 to an input circuit 21. Input 20 is connected to the grids 22 of a cathode follower tube 24 which has its plates 26 connected through a resistance 28 to a constant voltage line 30 carrying a voltage such as 400 volts. Also connected to plates 26 is the grid 32 of a triode 34 which has its plate 36 connected directly to line 30 and its cathode 38 connected through voltage reducer tubes 40 and then through a potentiometer 42 to a —200 volt source. The voltage reducer tubes 40 each reduce the voltage from the cathode 38 to the potentiometer 42 by a predetermined factor. The potentiometer pointer 44 is connected to the control grid 46 of a pentode 48 which has its cathode 50 connected to a —200 volt source through a voltage reducer 52, and has its plate 54 connected to the cathodes 56 of the cathode follower 24. Voltage reducer tube 52 reduces the voltage from cathode 50 to a —200 volt source by a suitable factor. Cathodes 56 are also connected to the input of the oscillator portion 57 of the conduit.

When a signal is applied to input 20 it sees a high impedance input and is reproduced in a linear manner to the oscillator portion 57. The linearity is achieved due to a feedback from the plate of tube 24 to its cathode in the following manner. The input signal is impressed upon the grids 22 of tube 24 causing a corresponding current in tube 24. If this current varies, the plate 26 potential will vary in an inverse manner since an increased current will cause a larger voltage drop across resistor 28 and a decreased current will cause a lower voltage drop across resistor 28, raising the voltage. The plate voltage is then applied to a grid 32 of the tube 34 which has its cathode and cathode potential connected through voltage reducers 40 and potentiometer 42 to the control grid 46 of tube 48. As the voltage on grid 32 changes, the amount of current through tube 48 will change in a corresponding manner, and since the plate 54 of tube 48 is connected to cathodes 56, and since the output from tube 34 varies in an inverse manner to the current flowing through tube 24, the output of tube 48 will be applied to the cathode output of tube 24 in a corrective manner. Also, by adjusting the pointer 44 on potentiometer 42, a zero input to oscillator 57 may be provided for a predetermined input voltage 20, so that the range in which the oscillator circuit works is easily varied.

Cathodes 56 are connected through resistances 58, 58A to grids 60 and 60A of pentodes 62 and 62A, which have their screen grids 78 and 78A connected through capacitors 68, 68A, diodes 70, 70A, triodes 72, 72A, parallel capacitances 74, 74A, respectively, to the grids 60A and 60 of the other pentode tube. It is this connection between the screen grid of one tube and the control grid of the other tube that results in the alternate triggering of the vibrator or oscillator circuit to provide the oscillator output corresponding to the direct current input.

Each plate 76 and 76A is connected to its respective control grid 60 and 60A through triodes 72, 72A, and parallel capacitances 74, 74A. Each screen grid 78, 78A is connected through capacitances 66 and 66A to the suppressor grids 64, 64A of their respective tubes and the lower plates of capacitances 66 and 66A are connected respectively to ground through resistances 80, 80A. Each screen grid 78, 78A is connected to constant potential line 30 through resistances 82, 82A respectively, and is connected through capacitors 68 and 68A and rheostat 86 to a constant potential of 150 volts. Adjustment of rheostat 86 establishes the top limit to the frequency output. Screen grids 78, 78A are also connected to the 150 volt source through diodes 88, 88A respectively, which, along with diodes 70 and 70A, are silicon diodes having the designation SG213.

Suppressor grids 64, 64A are connected to grids 90, 90A, respectively, of triodes 92, 92A which, in turn, have their plates 94, 94A, connected through capacitances 96, 96A and diodes 98, 98A, to the grid 100 of triode 102 which has its cathode connected to a regenerative oscillator 104 which sharpens the pulses from tube 102. By connecting each suppressor grid 64, 64A to a triode, the maximum number of pulses are available.

*Operation*

In the operation of this embodiment, a direct current input signal is applied to terminals 20, to high impedance input circuit 21 having cathode follower 24 and feedback circuit with tubes 34 and 48 which apply a correcting signal to the output of tube 24 to supply a signal, which is highly linear with respect to the input signal, to resistances 58 and 58A. The value of the signal to resistances 58 and 58A varies the oscillations in tubes 62, 62A. A linearity of ±.03% has been achieved by circuit portion 21.

Figure 5:
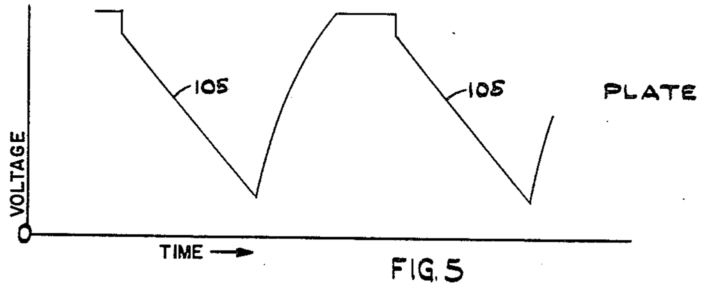
FIGURE 5 is a curve of a plate voltage in one of the phantastron circuit tubes.

The operation of each tube 62, 62A in the oscillator circuit portion 57 is best understood by reference to FIGURES 2–5. A negative pulse is applied to grid 60 of tube 62 by screen grid 78A of tube 62A, after tube 62A completes its plate rundown, through capacitance 68A, diode 70, tube 72, and capacitances 74. This reduction in the voltage of the grid 60 reduces the amount of current going to screen grid 78 and this, in turn, raises the voltage at the upper plate of capacitance 66 since the voltage drop across resistor 82 is now less. This raises the voltage of the lower plate of capacitance 66 and raises the voltage of suppressor grid 64 which is connected to the lower plate of the capacitor 66. This allows current flow through tube 62 to plate 76 and the potential of plate 76 begins to drop since increased current is flowing through resistor 77 to constant voltage line 30. The rate of the drop or slope of line 105 in FIGURE 5, is determined by the current flow through resistor 58 since it supplies current to the opposite sides of capacitances 74. The higher the current flow to resistor 58 from cathode 56 the faster the condenser 74 discharges and the higher the frequency of oscillations. The linearity of the plate 76 discharge is controlled by the discharge of capacitances 74.

Plate 76 will drop in potential until a space charge is created near the suppressor grid 64 creating a virtual cathode which prevents electrons from getting through to the plate. At this point the electrons go to screen grid 78 and this increases the potential drop across resistor 82, lowering the screen grid 78 potential (FIGURE 3) which, in turn, lowers the suppressor grid 64 voltage, cutting off plate current in tube 62. The fall in potential of screen grid 78 provides a negative pulse to the grid 60A of tube 62A through condenser 68, diode 70A, triode 72A and capacitors 74A. This initiates the cycle for tube 62A.

The potential at the lower plate of the capacitor 66 gradually begins to increase at a rate determined by the values of capacitor 66 and resistance 80 and, if, for some reason, tube 62A should fail to trigger the grid 60 of tube 62, the circuit would not stop since the voltage of the suppressor grid would in time increase sufficiently to fire tube 62, to provide a positive self start.

Figure 4:
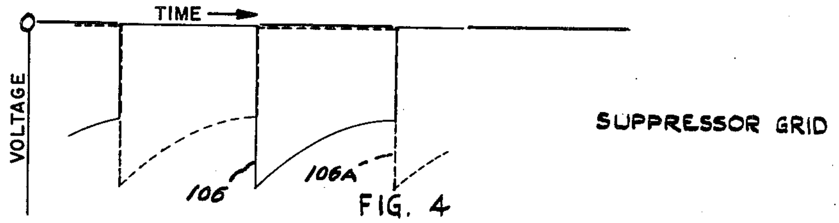
FIGURE 4 is a curve of a suppressor grid voltage in one of the phantastron circuit tubes.
Figure 3:
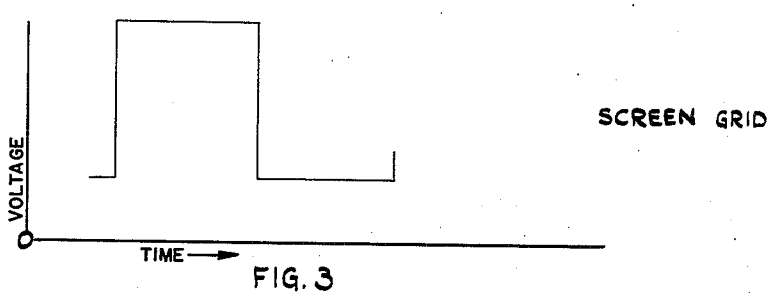
FIGURE 3 is a curve of the screen grid voltage in one of the phantastron circuit tubes.
Figure 2:
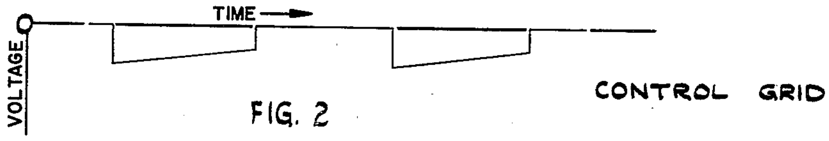
FIGURE 2 is a curve of the control grid voltage in one of the phatantastron circuit tubes.

The suppressor grid fluctuations of each tube are directed to the grids of tubes 92 and 92A to provide periodic outputs which appear at the grid 100 of tube 102 and then to regenerative oscillator 104 from which the output is taken. FIGURE 4 shows curves 106 and 106A, which represent the voltages of suppressor grids 64 and 64A, respectively.

The slope 105 of the plate 76 discharge partially determines the frequency of the output and the slope in turn is determined by the voltage applied to resistor 58.

Adjustment of pointer 44 along rheostat 42 can supply a desired voltage at resistor 58 for any given input voltage. Adjustment of rheostat 86 determines the length of slope 105 by varying the potential on diodes 70 and 70A to also regulate the frequency output, with a shorter slope length resulting in a higher frequency output. By adjusting rheostats 42 and 86, improved control between input voltage and output frequency is possible.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

Having thus described my invention, I claim:

1. A voltage controlled oscillator comprising two pentodes, each having a cathode, a control grid, a screen grid, a suppressor grid and a plate, plate supply voltage, the screen grid of each tube being connected through a diode, the cathode and grid of a cathode follower, and a capacitor means to the control grid of the other tube so that when one tube stops plate conduction the fall in screen grid voltage will cause a fall in control grid voltage of the other tube thereby causing said other tube to fire, in each tube the screen grid being coupled to the suppressor grid through a capacitance connection and said suppressor grid being coupled through a resistor to a potential equal to or larger than the potential required to cause firing of the tube so that discharge of said last named capacitor to said last named potential through said resistance will raise the suppressor grid voltage sufficiently to fire the tube.

2. The voltage controlled oscillator of claim 1 wherein each suppressor grid is connected to pulsing means so that a pulse is emitted once for each change of state of the oscillator circuit.

3. The voltage controlled oscillator of claim 2 wherein each of said pulsing means comprises a triode, each of which is connected to a regenerative oscillator, and said suppressor grid connected to the grid of the triode.

4. A high impedance linear voltage input to a voltage controlled oscillator comprising an input connection to the grid of a cathode follower tube, the cathode of said cathode follower tube being connected to the plate of a multielement tube means and to the input of the voltage controlled oscillator, the plate of said cathode follower tube being D.C. coupled to the grid of said multielement tube means, a voltage controlled oscillator comprising two pentodes, each having a cathode, a control grid, a screen grid, a suppressor grid and a plate, plate supply voltage, said cathode follower tube cathode being connected to the control grid of each of said pentodes, the screen grid of each tube being connected through a diode, the cathode and grid of a cathode follower, and a capacitor means to the control grid of the other tube so that when one tube stops plate conduction the fall in screen grid voltage will cause a fall in control grid voltage of the other tube thereby causing said other tube to fire, in each tube the screen grid being coupled to the suppressor grid through a capacitance connection and said suppressor grid being coupled through a resistor to a potential equal to or larger than the potential required to cause firing of the tube so that discharge of said last named capacitor to said last named potential through said resistance will raise the suppressor grid voltage sufficiently to fire the tube.

5. A high impedance linear voltage input to a voltage controlled oscillator comprising an input connection to the grid of a cathode follower tube, the cathode of said cathode follower tube being connected to the plate of a multielement tube means and to the input of the voltage controlled oscillator, said tube means comprising first and second multielement tubes, the plate of said cathode follower being connected to the grid of said first tube, the cathode of said first tube being connected to the grid of said second tube, the plate of said second tube being connected to the cathode of said cathode follower, a voltage controlled oscillator comprising two pentodes, each having a cathode, a control grid, a screen grid, a suppressor grid, and a plate, plate supply voltage, said cathode follower tube cathode being connected to the control grid of each of said pentodes, the screen grid of each tube being connected through a rectifier, the cathode and grid of a cathode follower, and a capacitor means to the control grid of the other tube so that when one tube stops plate conduction, the fall in screen grid voltage will cause a fall in the control grid voltage of the other tube thereby causing said other tube to fire, the plates of said pentodes being connected through rectifying means to a potentiometer so that adjustment of the potentiometer will lengthen or shorten the fall of plate voltage after tube cut-off to respectively decrease or increase oscillations.

6. A high impedance linear voltage input to a voltage controlled oscillator comprising an input connection to the grid of a cathode follower tube, the plate of said cathode follower being connected through a resistance to a constant voltage source, the cathode of said cathode follower tube being connected to the plate of a first multielement tube means, and to the input of the voltage controlled oscillator, a second multielement tube means, the plate of said cathode follower being connected to the grid of said second multielement tube means, the plate of said second multielement tube means being connected directly to a constant voltage source, the cathode of said second multielement tube means being connected through voltage reducer means and rheostat means to the grid of the first multielement tube means whereby any variation in output of said cathode follower tube means will cause a voltage change in the plate of said cathode follower means and a change in the voltage of the grid in said second tube means and a change in the voltage of plate in said first tube means which changes the cathode potential of said cathode follower in a corrective manner.

References Cited by the Examiner

UNITED STATES PATENTS

| | | | |
|---|---|---|---|
| 2,597,630 | 5/52 | French | 330—91 |
| 2,744,169 | 5/56 | Deming | 328—213 |
| 2,846,583 | 8/58 | Goldfischer et al. | 331—145 |
| 2,881,318 | 4/59 | Hughes et al. | 332—14 |
| 2,951,236 | 8/60 | Covely et al. | 331—145 |

ROY LAKE, *Primary Examiner.*

GEORGE N. WESTBY, ROBERT H. ROSE, *Examiners.*